Feb. 22, 1949.  G. HOHWART ET AL  2,462,501
DIAPHRAGM CHUCK
Filed June 10, 1947
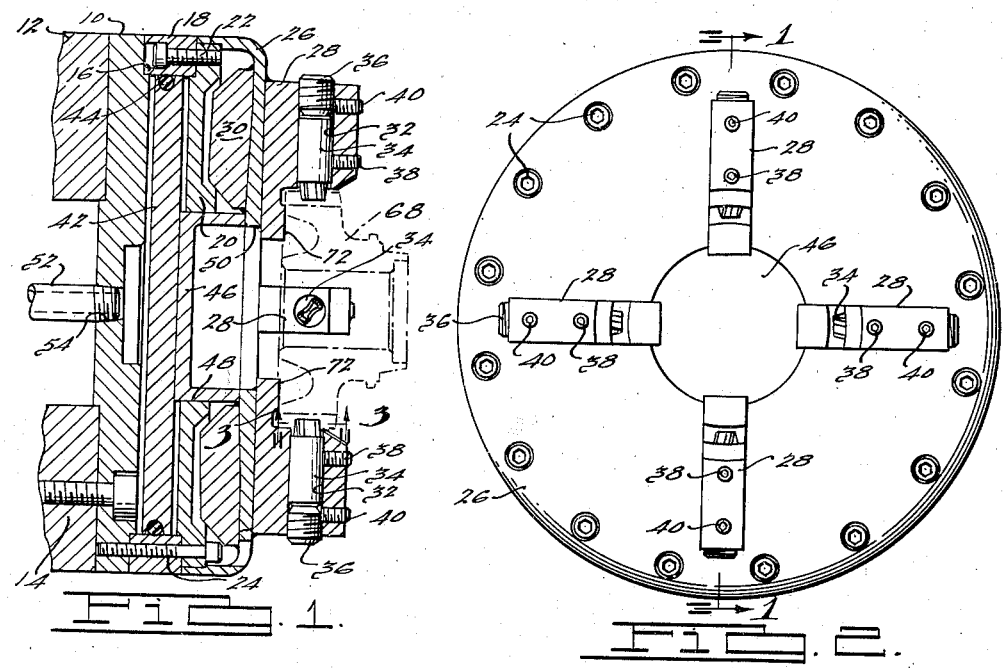
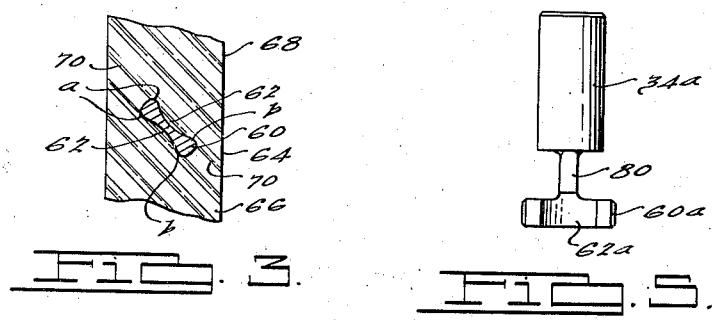
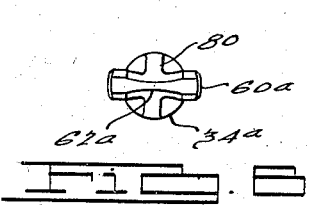
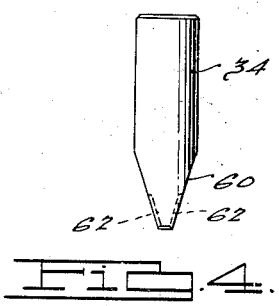
INVENTORS.
George Hohwart,
Ernest F. Hohwart.
BY
Harness, Dickey & Pierce
ATTORNEYS.

Patented Feb. 22, 1949

2,462,501

UNITED STATES PATENT OFFICE 2,462,501

DIAPHRAGM CHUCK

George Hohwart and Ernest F. Hohwart, Detroit, Mich., assignors to N. A. Woodworth Company, Ferndale, Mich., a corporation of Michigan Application June 10, 1947, Serial No. 753,785

9 Claims. (Cl. 279—46)

This invention relates to chucks and is particularly adapted to diaphragm chucks, the principal object being the provision of jaw means in a chuck particularly adapting the chuck to the chucking of gears.

Objects of the invention include the provision of a chuck having jaw means so constructed and arranged as to enable a spiral gear to be chucked in concentric relation with respect to the axis of rotation of the chuck; the provision of a construction as above described which will insure the alignment of the axis of the gear being chucked with the axis of the chuck itself; the provision of chucking means particularly adaptable for use with helical gears and including jaw members adapted to engage between the teeth of the gear substantially on the pitch line thereof and providing points or short lines of contact between each jaw member and the gear spaced from each other axially of the gear; and the provision of means as above described capable of yielding to compensate for slight irregularities existing in the initial contact between gear engaging elements and the gear teeth.

The above being among the objects of the present invention, the same consists in certain novel features of construction and combinations of parts to be hereinafter described with reference to the accompanying drawing, and then claimed, having the above and other objects in view.

In the accompanying drawing, which illustrates suitable embodiments of the present invention and in which like numerals refer to like parts throughout the several different views, Fig. 1 is a vertical sectional view taken diametrically through a diaphragm chuck provided with jaw means formed in accordance with the present invention;

Fig. 2 is a front face view of the chuck shown in Fig. 1;

Fig. 3 is an enlarged fragmentary transverse sectional view taken on the line 3—3 of Fig. 1, namely, a transverse sectional view through the operative end of one of the jaw pins and illustrating the relationship which exists between it and a helical gear being chucked thereby;

Fig. 4 is an enlarged side elevational view of one of the chucking pins employed in the chuck shown in the preceding views;

Fig. 5 is a view similar to Fig. 4, but showing a modified form of pin construction; and Fig. 6 is an end view of the pin shown in Fig. 5.

In the chucking of gears for the purpose of machining the bore thereof it is, of course, important to maintain the concentricity between the bore and the pitch diameter of the gear if the gear is to operate properly and quietly in service. The attainment of this condition is materially aided if the engagement between the gear and the chucking means is on the pitch circle of the gear, as the pitch circle may vary to a greater or lesser extent from true concentricity with respect to the outer periphery of the gear.

It is, of course, also important to maintain the axis of the gear, and particularly the pitch cylinder thereof, in absolute alignment with the axis of rotation of the chuck. Where the gear is a straight spur gear having teeth extending parallel with the axis of the gear, such condition may be readily realized with the types of gear engaging elements disclosed and claimed in our copending application for Letters Patent of the United States for improvements in Diaphragm chuck, filed January 3, 1947, and serially numbered 719,964. As there disclosed, each jaw assembly is provided with a gear-engaging pin having a tapered or wedge-like radially inner end adapted to fit between a pair of teeth of the gear and contact such teeth on the pitch line thereof. Where such wedge-like ends are of a material dimension axially of the chuck and each is positioned radially of the chuck so that its intended lines of engagement with the teeth of the gear are identical to those of all the other pins with respect to the axis of the chuck, then of course a straight spur gear chucked thereby will not only be held with its axis parallel to the axis of rotation of the chuck, but in such position that the pitch diameter of the gear will be in substantially absolute concentricity with respect to the axis of rotation of the chuck.

In straight spur gears the wedge-like end of each such pin, when the opposite faces thereof are at the proper angle with respect to each other and at an equal angle to the center line of the pin, will contact the two teeth of the gear between which it is received on the pitch line thereof and along a line parallel to the axis of the gear. When employed in connection with helical gears, then although such wedge-like end of a pin will have line contact with the two teeth of the gear between which it is received, and as long as the width of the wedge is not unduly great in comparison to the diameter of the gear, the lines of contact between each face of the wedge-like end and the tooth will not be parallel to the axis of the gear but will be at an angle with respect thereto, the lines of contact on opposite sides of the wedge-like end being inclined to the axis of the gear in opposite directions. Nevertheless the contact is such that when a plurality of such pins arranged at the same distance radially from the axis of the chuck and spaced from each other angularly about the axis of a chuck engage a gear between them, the gear will be urged toward and held in a position wherein the axis of its pitch cylinder will be concentric with the axis of rotation of the chuck.

Those skilled in the art will appreciate, however, that where gear-engaging pins such as those shown and described in our prior application above referred to, or their equivalent, are used, unless such pins have full line contact with the gear teeth an improper condition exists. Dirt or other foreign material finding its way between the pins and the teeth the wedge-like ends of the pins may prevent such line contact and result in such improper condition.

The present invention relates to a form of pin construction whereby the same benefits as result from the use of the pins of our prior application above identified when applied to either straight or helical spur gears in which the possibility of dirt or other foreign material disrupting the proper engagement between the teeth of the gear being chucked and the pins is greatly reduced without affecting the accuracy or utility of the construction. This is accomplished by employing such pins or their equivalents with the same wedge-like ends as in our prior application above identified, but so modified as to provide four points, or relatively short lines, of contact between each pin and the two teeth of a gear between which it is to be engaged. While broadly speaking this may be accomplished in any suitable manner, we have found that it may perhaps be best and most economically attained by simply relieving the wedge-like ends of the pins of our prior application above identified centrally between the opposite ends of the wedge-like faces thereof. In so relieving such wedge-like ends of the pins between the opposite wedge-like ends of the wedges, it provides clearance for the teeth between such ends of the wedges and limits contact between the pins and the teeth of the gear to the opposite ends of such wedges. These points or short lines (depending upon the extent of such reliefs) of contact at opposite ends of the wedges are, of course, spaced from each other axially of the gear and all combine to provide points of contact between the pins and the gear which are both circumferentially and axially spaced from one another and lie substantially in an imaginary cylindrical surface concentric with the axis of rotation of the chuck. By this simple expedient, accurate chucking of gears, and particularly spiral toothed gears is possible, as above indicated, whether point contact or short line contact results between the wedge-like ends of the pins and the cooperating gear teeth will depend upon the extent to which the side faces of the wedge-like ends are relieved and, this being clearly understood, for the purpose of simplicity in description, such contact will hereafter be referred to in the specification as "point" contact, and is to be interpreted as inclusive of short line contact.

Furthermore, it will be appreciated by those skilled in the art that the application of the present invention is not solely limited to the application thereof to diaphragm chucks. The application of the present invention to diaphragm chucks will, however, be found to be particularly advantageous in that once the chucking pins or the equivalent are located in the proper relation on the chuck, there are no parts which, in moving relative to one another between operative and inoperative chucking positions, may develop wear and thereby destroy the accurate positioning of the gear-engaging elements initially established.

Particularly for the purpose of illustration, the present invention is illustrated as being applied to a diaphragm chuck of the general type shown, described and claimed in our co-pending application for Letters Patent of the United States for improvements in Diaphragm chuck, filed July 13, 1946, and serially numbered 683,458, but modified to this extent, that such chuck is provided with jaw assemblies of the type shown, described and claimed in our co-pending application first above identified.

Referring now to the accompanying drawing, it will be noted that the chuck there shown by way of illustration includes a disk-like mounting plate 10 shown piloted upon the axially outer end of a machine tool spindle 12 and secured thereto by means of screws 14. The axially outer face of the mounting plate 10 is shouldered as at 16, and piloted concentrically thereon is a ring member 18, the bore of which provides a cylinder bore as will hereinafter be more fully appreciated. A backing plate 20 is provided with a shouldered axially rear face piloted in the bore of the ring member 18 and is secured thereto by means of screws 22. Screws 24 which project rearwardly through the backing plate 20 and ring 18 and thread into the mounting plate 10, serve to maintain these three parts in unitary assembled condition. The diaphragm 26 is of the centrally apertured cup-shaped type disclosed in United States Patent No. 2,403,599, and is positioned in concentric relation with respect to the remainder of the chuck with its open side facing rearwardly and piloted over the periphery of the backing plate 20 to which it may be secured in any suitable manner as far as the present invention is concerned, but is preferably welded or brazed thereto as disclosed and claimed in our co-pending application for Letters Patent of the United States for improvements in Diaphragm chuck, Serial No. 683,456, filed July 13, 1946.

The diaphragm 26 may carry three or more preferably equally angularly spaced jaw assemblies. In the drawings, by way of illustration, four equally angularly spaced jaw assemblies are shown. Each jaw assembly comprises a jaw block member 28 securely fixed to the outer face of the diaphragm 26 by any suitable means, but preferably by welding or brazing as disclosed in our co-pending application for Letters Patent of the United States last identified. A counterweight 30 is similarly fastened to the inner face of the diaphragm 26 in alignment longitudinally of the chuck with each jaw base 28 so as to offset the tendency of centrifugal force acting on the jaw block 28 to open the chuck during rotation when employed for external chucking operations.

The jaw assemblies including the block 28, except for the specific conformation of the operative end of the gear-engaging pins, are substantially identical to those shown and described in our co-pending application for Letters Patent of the United States for improvements in Diaphragm chuck, Serial No. 719,964, filed January 3, 1947. In other words, each jaw block 28 is provided with a radial bore 32 in which a pin 34 is rotatably and axially slidably received. A cooperating adjusting and backup screw 36 is threaded into the radially outer end of each bore 32 in abutting relationship with respect to the outer end of the corresponding pin 34, so that inward adjustment thereof in the bore 32 effects a corresponding adjustment of the pin 34 in such bore. Set screws 38 and 40 are provided in each jaw block in transverse relation with respect to the bore 32 for locking the pin 34 and adjusting screw 36, respectively, in their axially and rotatably adjusted positions. The inner ends of the pins 34 are adapted to engage between the teeth of a gear to be chucked and they are adapted to be moved between operative and inoperative position by axially flexing the central portion of the diaphragm 26.

The central portion of the diaphragm is caused to be axially flexed in the following manner. A piston 42 is reciprocably received within the ring 18 between the mounting plate 19 and the backing plate 20. These last-numbered parts are preferably spaced from one another only by an amount slightly in excess of the movement required for the central portion of the diaphragm in order to flex it from free position to receive and/or to release a piece of work from the jaws thereof. In the particular case shown, the periphery of the piston 42 is sealed to the bore of the ring 18 by means of a resilient O-ring seal 44 received in a peripheral groove in the piston 42.

Inasmuch as the present invention is illustrated in connection with a chuck adapted for externally chucking a gear, in order to move the diaphragm to release a piece of work from the chuck the central portion of the diaphragm must be flexed axially outwardly. In such case the piston 42 is normally positioned in the rear portion of the bore formed by the ring 18, and means are provided between it and the central portion of the diaphragm serving to spring the latter axially outwardly upon the application of fluid under pressure to the rear face of the piston 42. In the case shown, such means comprise a cup-shaped member 46 arranged coaxially with the axis of rotation of the chuck and with its closed end abutting the forward or outer face of the piston 42. It is axially slidably received and guided in a central opening 48 in the backing plate 20 and its rim or forward edge lies in abutting relationship with respect to the axially inner face of the diaphragm immediately outwardly of the central opening 50 provided therein.

Fluid under pressure is introduced into the space between the mounting plate 19 and the piston 42 through a tube or pipe 52 positioned on the axis of rotation of the chuck and projecting through the bore of the spindle 12 of the associated machine tool and threaded at its forward end into a central opening 54 provided in the mounting plate 19. Upon the application of fluid under pressure to the pipe 52, the piston 42 is forced axially outwardly and, acting through the member 46, causes the central portion of the diaphragm 26 to flex outwardly and in so doing effecting a small but material radially outward movement of the pins 34 sufficient to release a piece of work chucked thereby and to permit the replacement thereof by a new workpiece. Upon release of the fluid under pressure in the pipe 52, the force built up in the diaphragm 26 in springing it as above described is sufficient to return the member 46 and piston 42 toward their inoperative positions and to effect a radial inward movement of the pins 34 into clamping engagement with the work positioned between them.

In accordance with the present invention, and as best brought out in Figs. 3 and 4, each pin 34 is provided with a cylindrical body terminating at its radially inner end in a wedge-like end 60. The opposite side faces of the wedge-like end 60 may, except as herein noted and in accordance with the present invention, be considered as plane faces disposed at an equal angle on either side of a central plane passing midway between them and including the axis of the pin 34. The included angle between the opposite wedge faces of the point 60 is preferably such that when the end 60 is radially engaged between two adjacent teeth of a gear, such faces will contact such teeth substantially on the pitch line thereof. It will thus be observed that the end 60 of each pin 34 has generally the form of a rack tooth and in use it is adapted to fit between and mesh with adjacent teeth of the work 68.

In accordance with the present invention, the opposite side faces of the ends 60 are relieved or cut away between the opposite ends thereof, as indicated at 62 in Figs. 3 and 4, and so that the ends 60 in engaging between a pair of adjacent teeth such as the teeth 64 and 66, as indicated in Fig. 3, of a gear such as 68, engage each tooth at two points, $a$ and $b$, spaced from each other axially of the gear, these points, because of the shape and angularity of the ends 60, being substantially on the pitch lines 70 of such teeth.

It will be appreciated that with this construction all the points of contact between the pins 34 and a gear such as 68 are located substantially in an imaginary cylinder including the pitch lines of the various teeth of the gear and part of which points are spaced from one another circumferentially of such cylinder and part of which are spaced from one another axially of the cylinder. Under such conditions, when the jaws are contracted upon a piece of work, such as the gear 68, even though it is provided with spiral teeth such as shown, the pressure exerted between the pins and the gear at these various points tends to bring the axis of such pitch cylinder into accurate alignment with the axis of rotation of the chuck. Such action has proven to be the fact in practice and to be of a material aid in the accurate production of such gears.

It will, of course, be appreciated that in practice means are preferably provided for locating the work axially with respect to the chuck, and such means are preferably so arranged as to aid in initially presenting the work in proper relation to the jaws or work-engaging elements of the jaw assemblies. In the present case each jaw block 28 is radially inwardly extended and formed to provide a stop face 72 for engaging the rim of the gear 68. All of the faces 72 lie in a single plane perpendicular to the axis of rotation of the chuck so that when the gear 68 is applied to the chuck and pressed against these faces, it is located approximately in its final position and so that pressure applied to it at the points $a$ and $b$ will require a minimum amount of shifting of the gear to accurately bring it to its desired final position.

Particularly in diaphragm chucks, it will be appreciated that the pins 34, in moving between operative and inoperative positions due to flexing of the central portion of the diaphragm 26 axially, have a bodily movement which is a combination of movements both radially and axially of the chuck and while, under such circumstances, if the pitch diameters of the gears being chucked thereby are maintained at a predetermined size without any variation whatever, the pins 34 theoretically could be adjusted to bear against the teeth of the gear at all points *a* and *b* with the same pressure, such pitch diameters are bound to vary to a small extent in practice, and the axially adjusted positions of the pins 34 may not be perfectly adjusted in all cases. For this reason, there may be a tendency of either the points *a* or the points *b* to be the only points of contact with the work, or to bear against the work with a greater pressure than the other points. In actual practice, any resulting inaccuracy is so minor as to be unimportant from a practical standpoint. Nevertheless, in some cases it is desirable to avoid the same and this can be accomplished in accordance with a narrower phase of the invention as now described. In order to compensate for these irregularities of the work and for the pins 34 in practice, it is desirable that the inner gear-engaging ends of the pins be capable of flexing to a slight extent to compensate for such irregularities and so that all points of intended contact between the pins and the work bear against the work with substantially equal pressure.

A modification of the first described pin construction to obtain this last effect is shown in Figs. 5 and 6. In this case, the pins corresponding to the pins 34 are indicated at 34*a*. Each pin 34*a* is provided with an end 60*a* corresponding with the pin 60 of the pins 34 first described and similarly relieve as at 62*a* between its opposite end portions. In this case, however, the end 60*a* is connected to the body 34*a* by a neck portion 80 of reduced thickness in a plane perpendicular to the length of the end 60*a* so that, as viewed in Fig. 5, the end 60*a* may flex about the plane of thickness of the neck 80. It will be appreciated that with this construction, upon closing of the chuck upon a piece of work, should any of the inaccuracies of the type above described tend to limit contact between the ends 60*a* of the pin 34*a* at the point *a*, for instance, to the exclusion of the points *b*, a lateral pressure will be applied to the neck 80 causing it to flex and thus bring the points *b* into active engagement with the cooperating teeth of the gear in addition to the points *a*, and thus overcome the disadvantages which would otherwise be experienced.

What is claimed is:

1. In a chuck for helical gears, in combination, a chuck body, and a plurality of angularly spaced jaw devices mounted on the forward face of said body, each of said jaw devices comprising a radially movable member having a tapered inner end portion adapted to be received between a pair of adjacent teeth of a spirally toothed gear to be chucked thereby, the medial plane of each of said end portions being disposed at an angle with respect to the forward face of said chuck corresponding to the angle which said adjacent teeth in which it is adapted to be received is disposed with respect to such face, each said end being formed to engage the corresponding of said teeth at points spaced from one another axially of said chuck.

2. In a chuck, in combination, a chuck body, a plurality of jaw devices mounted on the axially outer face of said body in angularly spaced relation with respect to each other, each of said jaw devices including a part adapted to be received between a pair of adjacent teeth of a gear to be chucked thereby, each of said parts being formed to contact the corresponding said teeth of said gear at two pairs of points, one of which pairs is spaced from the other thereof axially of said chuck, and all of said points lying in the surface of an imaginary cylinder concentric with the axis of said chuck.

3. In a chuck, in combination, a body, and a plurality of jaw assemblies secured to the outer face of said body in angularly spaced relation with respect to each other about the axis of said chuck, each said jaw assembly comprising a jaw block and a pin rotatably and axially movably supported thereby with its axis extending radially with respect to the axis of said chuck, the radially inner end of each said pin being tapered into wedge-like form and adapted to be received between adjacent teeth of a spiral gear comprising a workpiece carried by said chuck with its medial plane aligned with the direction of length of said teeth, said tapered ends of said pins being relieved centrally of their opposite wedge faces whereby to limit contact between said ends and the teeth of a gear received thereby to points spaced axially of said chuck from one another.

4. In a chuck, in combination, a body, a plurality of jaw assemblies secured to the outer face of said body in angularly spaced relation with respect to each other about the axis of said chuck, each said jaw assembly comprising a jaw block and a pin rotatably and axially movably supported thereby with its axis extending radially with respect to the axis of said chuck, means for locking said pins in their respective jaw blocks against relative movement therein, the inner ends of said pins each being formed to provide a pair of radially outwardly divergent surfaces equally disposed on opposite sides of a median plane including the axis of the pin and being disposed at an angle with respect to the forward face of said body corresponding with the helix angle of the teeth of a spiral gear to be chucked thereby, said surfaces of said ends of said pins being relieved between their opposite ends whereby to limit contact between said pins and the corresponding teeth of a gear to be chucked thereby to points spaced axially of said chuck, all of said points lying in an imaginary cylindrical surface concentric with the axis of said chuck.

5. In a chuck, in combination, a body, and a plurality of jaw assemblies secured to the outer face of said body in angularly spaced relation with respect to each other about the axis of said chuck, each said jaw assembly comprising a jaw block and a pin rotatably and axially movably supported thereby with its axis extending radially with respect to the axis of said chuck, each of said pins comprising a body portion, a radially inner end portion, and a flexible neck portion connecting said body portion and said end portion, said end portion being of wedge-like formation including a pair of opposite faces diverging radially outwardly of the axis of said chuck from one another and equally disposed on opposite sides of the medial plane including the axis of said body, said medial plane being disposed at an angle with respect to the forward end of said chuck corresponding with the helix angle of a pair of teeth of a spiral gear between which said end is adapted to be received, and said faces being relieved between the opposite ends thereof whereby to limit contact between each such face and the tooth of a gear to be engaged thereby to points spaced from each other axially of said chuck, said points lying in the surface of an imaginary cylinder concentric with the axis of said chuck and substantially including the pitch lines of the teeth of a gear to be chucked thereby, each said neck being yieldable in a direction laterally of the axis of its body in the direction of length of said end.

6. A chucking element having a terminal portion generally in the form of a rack tooth, each side of said rack-tooth portion having two laterally spaced individual work-engaging surfaces.

7. A chucking element having a terminal portion generally in the form of a rack tooth, each side of said rack-tooth portion being relieved intermediate its ends to provide spaced work-engaging surfaces.

8. A chucking element having a body portion and a terminal rack-tooth portion connected by a flexible neck portion, each side of said rack-tooth portion being relieved intermediate its ends to provide spaced work-engaging surfaces.

9. A chucking element having a body portion and a terminal rack-tooth portion connected by a neck portion, said neck portion being flexible about a plane disposed transversely with respect to said rack-tooth portion and including said neck portion, and each side of said rack-tooth portion being relieved intermediate its ends to provide spaced work-engaging surfaces.

GEORGE HOHWART.
ERNEST F. HOHWART.

REFERENCES CITED

The following references are of record in the file of this patent:

UNITED STATES PATENTS

| Number | Name | Date |
| --- | --- | --- |
| 1,956,318 | Draper | Apr. 24, 1934 |
| 2,389,366 | Jones | Nov. 20, 1945 |
| 2,403,599 | Hohwart et al. | July 9, 1946 |